(12) United States Patent
Nadamoto et al.

(10) Patent No.: US 7,856,594 B2
(45) Date of Patent: Dec. 21, 2010

(54) RELATED WEB CONTENTS SYNCHRONIZATION AND PRESENTATION SYSTEM AND METHOD

(75) Inventors: Akiyo Nadamoto, Tokyo (JP); Katsumi Tanaka, Tokyo (JP)

(73) Assignee: National Institute of Information and Communications Technology, Tokyo (JP)

( * ) Notice: Subject to any disclaimer, the term of this patent is extended or adjusted under 35 U.S.C. 154(b) by 1147 days.

(21) Appl. No.: 11/513,955

(22) Filed: Aug. 31, 2006

(65) Prior Publication Data

US 2006/0294461 A1 Dec. 28, 2006

(51) Int. Cl.
G06F 17/00 (2006.01)
G06F 17/27 (2006.01)
G06F 17/28 (2006.01)

(52) U.S. Cl. ............... 715/205; 715/234; 715/255; 715/267; 715/273; 715/277

(58) Field of Classification Search ......... 715/200, 715/205, 243, 249, 267, 273, 277, 234, 255
See application file for complete search history.

(56) References Cited

U.S. PATENT DOCUMENTS

| | | | | |
|---|---|---|---|---|
| 5,815,830 | A * | 9/1998 | Anthony | 707/758 |
| 6,070,176 | A * | 5/2000 | Downs et al. | 715/234 |
| 6,457,004 | B1 * | 9/2002 | Nishioka et al. | 715/234 |
| 6,560,620 | B1 * | 5/2003 | Ching | 715/229 |
| 6,658,626 | B1 * | 12/2003 | Aiken | 715/205 |
| 6,988,093 | B2 * | 1/2006 | Pic et al. | 707/1 |
| 7,047,182 | B2 * | 5/2006 | Masuichi | 715/259 |
| 7,194,483 | B1 * | 3/2007 | Mohan et al. | 707/600 |
| 7,536,413 | B1 * | 5/2009 | Mohan et al. | 1/1 |
| 7,548,863 | B2 * | 6/2009 | Kida et al. | 704/277 |
| 2001/0012991 | A1 * | 8/2001 | Kimpara et al. | 704/5 |

OTHER PUBLICATIONS

Jingyu Hou, Yanchun Zhang and Jinli Cao, "Web page clustering: a hyperlink-based similarity and matrix-based hierarchical algorithms", 2003, Springer-Verlag Berlin, Heidelberg, pp. 201-212.*

Jingyu Hou, and Yanchun Zhang, "Constructing good quality web page communities", 2002, Australian Computer Society, Inc. Darlinghurst, Australia, Australia, pp. 65-74.*

Haveliwala, T. et al.; Evaluating Strategies for Similarity Search on the Web, www2002, May 7-11, 2002, Honolulu, Hawaii, http://www2002org./CDROM/refereed/75/index.html.

Dean, J., Finding Related pages in the World Wide Web, 8th Int'l World Wide Web Conference (WWW8), Toronto, Canada, May 1999, http://www8.org/w8-papers/4a-search-mining/finding/ww801.html.

Liu, Bing et al., Visualizing Web Site Comparisons, www2002, May 7-11, 2002, Honolulu, Hawaii, http://www2002.org/CDROM/refereed/571/index.html.

Nadamoto, A. et al.: "B-CWB: Multilingual Web Browser for Concurrent Browsing of Different Perspectives of Similar Contents", DBSJ Letters vol. 2, No. 2, pp. 1-4, with Partial English Translation (summary).

* cited by examiner

*Primary Examiner*—Chau Nguyen

(57) ABSTRACT

A system including a site specifying portion for receiving an identifier of a base site that becomes the basis of a displayed presentation and receives an identifier of a compared site displayed in a language different from that of the base site, a base page specifying portion that specifies a base page from the base site, a language converting portion that consolidates words of different languages into a single language, an aggregated word information producing portion that produces information for comparing the base page, a related page specifying portion that specifies a related page similar to the base page from among each compared page based on the word information of the base page and the word information of each compared page, and a display controlling portion that presents the related page together with the base page on the same display screen.

8 Claims, 10 Drawing Sheets

RELATED WEB CONTENTS SYNCHRONIZATION AND PRESENTATION SYSTEM AND METHOD

CROSS-REFERENCE TO RELATED APPLICATION

This application is based on U.S. patent application Ser. No. 10/892,515 filed on Jul. 15, 2004.

FIELD OF THE INVENTION

This invention pertains to a related Web contents search and presentation system that aims to simultaneously present to a user multiple Web pages whose contents are related.

DESCRIPTION OF RELATED ART

The World Wide Web (WWW), implemented by browsers over the Internet, is practically as common a medium as radio or TV, which makes it possible to obtain news of foreign countries by browsing the contents of foreign news Web sites in countries around the world. Since the content of a news source can be presented in various ways depending on the viewpoint of the press or editors that create the content, and an incident or an accident may be portrayed from various points of view in different countries, audiences or readers may receive markedly different impressions regarding the same news item.

For example, in the case of a news item about a war between country A and country B, a report provided by country A might exaggerate the bad points of country B, and vice versa. The World Wide Web makes it possible for audiences or readers to grasp and compare how a given news item is reported by different news sources in different countries, which has the potential to profoundly change our lives or worldviews.

In order to compare multiple Web pages, however, related pages must be searched for across multiple Web pages and the contents of such related pages must be read by opening a number of Web pages or Web browser instances separately, scrolling each window or viewing pane, and so on. This cumbersome process makes it difficult for the user to compare multiple Web sites. Conventional studies such as "Finding Related Pages in the World Wide Web", The 8th International World Wide Web Conference (WWW8), Toronto, Canada, May 1999, http://www8.org/w8-papers/4a-search-mining/finding/finding.html by Dean, J., and Henzinger, M., and "Evaluating Strategies for Similarity Search on the Web "The 11th International World Wide Web Conference (WWW2002), Honolulu, Hi., May 2002, http://www2002.org./CDROM/refereed/75/index.html by Haveliwala, T., Gionis, A., Klein, D., and Indyk, P. offer systems wherein similar Web pages are automatically searched.

However, these studies do not indicate methods for controlling the display and presentation of related pages from disparate sources in a unified manner. Furthermore, in order to compare Web sites with content in various languages, not only do multiple Web browsers have to be operated simultaneously, but also multiple languages have to be understood by the user, which makes it even more difficult for the user to browse multiple Web pages with ease.

SUMMARY OF THE INVENTION

In order to solve the above-mentioned problems and to make it extremely easy to browse and compare multiple Web pages in various languages, the present claimed invention, as defined in the claims, is arranged so as to find related Web pages among multiple Web sites in various languages designated by a user and to automatically present the contents of such related Web pages at the same time, in a single window, synchronously, under the control of the user, who performs simple operations such as navigating backward, forward, and clicking or scrolling.

The related contents synchronization and presentation system in accordance with the present claimed invention is characterized as comprising a site specifying portion that receives an identifier of a base site as a Web site that becomes the basis of the displayed presentation and specifies this base site and receives an identifier of a compared site as a Web site displayed in a language different from that of the base site and specifies the compared site, a base page specifying portion that specifies a base page as a Web page from the base site shown on a display screen, and a language converting portion.

The language converting portion has a function of consolidating the languages of words included in each site into a single language. The related contents synchronization and presentation system further includes an aggregated word information producing portion that has functions to produce aggregated word information as information based on the words included in a Web page or a paragraph and derived through the language converting portion in a manner that enables comparison with other aggregated word information, a related page specifying portion that specifies one or multiple related pages similar to the base page from among each of the compared pages based on a comparison between the aggregated word information of the base page and the aggregated word information of each compared page as a Web page in the compared site, and a display controlling portion that presents the related page together with the base page on the same display screen.

If the related page specifying portion further has a function of specifying a related paragraph that is similar to a paragraph in the base page, taken from the related pages and based on a comparison between the base paragraph aggregated word information as aggregated word information of a paragraph indicated and displayed in a predetermined position of the display window of the base page and the aggregated word information of each related paragraph in the related page, and the display controlling portion further has a function of displaying these related paragraphs in a predetermined position of the screen, then it will be possible for the user to grasp the similarity of the content of the target paragraphs, thereby facilitating the comparison and browsing of a set of related Web pages.

If the related page specifying portion further has a function of producing difference information between the aggregated word information of each paragraph in the related pages and the base paragraph aggregated word information, respectively, and the display controlling portion further has a function of displaying this difference information for each paragraph of the related pages shown on the display screen in a visually recognizable manner, it will be possible for the user to easily grasp the degree of similarity of each of these paragraphs to the base paragraph, thereby improving usability.

A preferable mode for calculating the degree of similarity for comparison of content represented in different languages is for the related page specifying portion to produce a feature vector whose element is a value obtained by multiplying the frequency of the appearance of each word constituting aggregated word information by a weighting coefficient concerning the part of speech of the words, to calculate a Euclidian distance between feature vectors produced from two elements of the aggregated word information being compared, and to judge the compared page to be similar if the Euclidian distance is less than or equal to a predetermined threshold value.

Concrete aggregated word information is handled as a data structure comprising one or multiple sets for each subject word, that is a word wherein the value obtained by multiplying the frequency of the appearance of the word by a weighting coefficient pertaining to its part of speech is over a predetermined threshold value, and a single content word or group of content words whose degree of concurrence with the subject word exceeds a predetermined threshold value, wherein the content word(s) group correlates with the subject word.

When handling word information, it is preferable that the related page specifying portion only compares aggregated subject words appearing in both the base and related page, and only compares aggregated content words that appear in both the base and related page.

Further, in order to present difference information in a way that enhances the user experience by utilizing the comparison of subject and content words, it is preferable that the related page specifying portion consider a paragraph whose subject words are similar by not less than a predetermined degree and whose content words are similar by not less than a predetermined degree as being a globally related paragraph, a paragraph whose subject word alone is similar by not less than the predetermined degree as being a content different paragraph, and a paragraph whose content word alone is similar by not less than the predetermined degree as being a subject different paragraph, by comparison with the aggregated word information of the base page, and that the display controlling portion further has a function of displaying the globally related paragraph, the content different paragraph and the subject different paragraph in a visually and thereby easily recognizable manner.

The related page specifying portion may extract and display multiple related pages, however, it is preferable to specify a compared page that is the most related to the base page as the related page. As a concrete mode for display representation, it is preferable that the display controlling portion presents the base page and the related page in the same display window. In cases where the language of the base site is different from that of the compared site, related words are easily viewable if the display controlling portion presents them in both the base page and the related page in a mode that makes their relationship clear and indicates their difference from other words.

In cases where the system is comprised of multiple, networked computers, it is preferable to have a central information processing unit or server that maintains and operates the site specifying portion, base page specifying portion, language converting portion, aggregated word information producing portion and related page specifying portion, and client stations that operate the display controlling portion of the system.

In addition, a related page synchronization and presentation method in accordance with the present claimed invention is characterized as comprising a site specifying step that receives an identifier of a base site as a Web site that becomes the basis of the displayed presentation and specifies this base site and receives an identifier of a compared site as a Web site displayed in a language different from that of the base site and specifies the compared site, a base page specifying step that specifies a base page as a Web page from the base site and shown on a display screen, a language converting step that has a function of consolidating the languages of the words included in each site into a single language, an aggregated word information producing step that produces aggregated word information whose elements consist of all or some of the words included in a Web page or a paragraph obtained through the language converting step in a manner that enables comparison with other aggregated word information, and a related page specifying step that specifies one or multiple related pages similar to the base page from among each compared pages based on a comparison between the aggregated word information of the base page and the aggregated word information of each compared page as a Web page in the compared site.

Furthermore, a program in accordance with the present claimed invention is characterized by a computer equipped with functions of a site specifying portion that receives an identifier of a base site as a Web site that becomes the basis of the presentation and specifies this base site and receives an identifier of a compared site as a Web site displayed in a language different from that of the base site and specifies the compared site, a base page specifying portion that specifies a base page as a Web page from the base site shown on a display screen, a language converting portion that functions to consolidate the languages of the words included in each site into a single language, an aggregated word information producing portion that functions to produce aggregated word information whose elements consist of all or some of the words included in a Web page or a paragraph obtained through the language converting portion in a manner that enables comparison with other aggregated word information, and a related page specifying portion that specifies one or multiple related pages similar to the base page from among each of the compared pages based on a comparison between the aggregated word information of the base page and the aggregated word information of each compared page as a Web page in the compared site.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the intention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1:
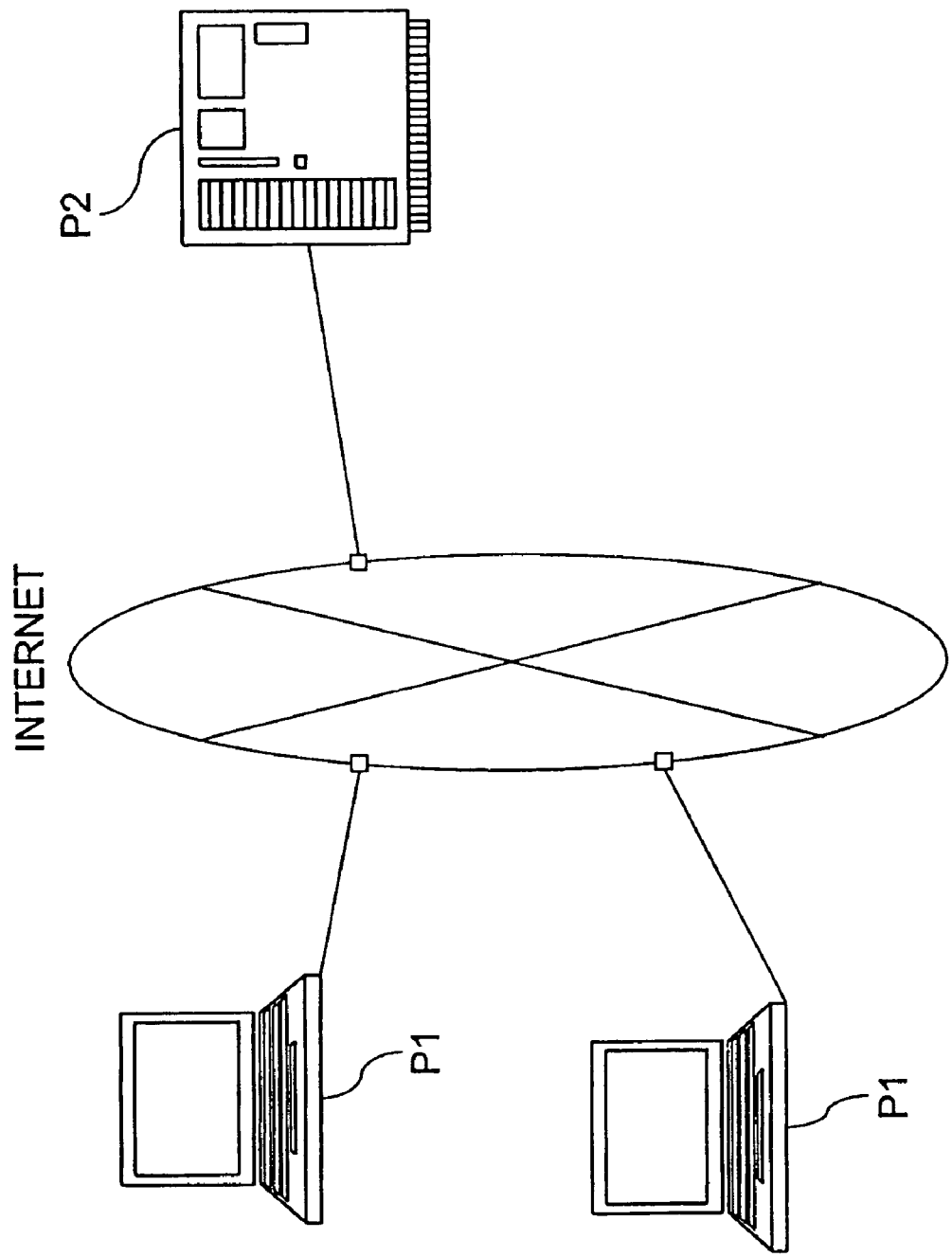
FIG. 1 is a schematic representation of an equipment configuration of a content synchronization system for related Web pages in accordance with an embodiment of the present invention.

A. Configuration: FIG. 1 is a diagram of an equipment configuration of the related page synchronization and presentation system that shows the basic embodiment of its topology. The system is arranged such that client computers P1 (terminal units) are connected with a server computer P2 (an information processing unit) in a communicable manner, and each computer P1, P2 is connected to the Internet.

Figure 2:
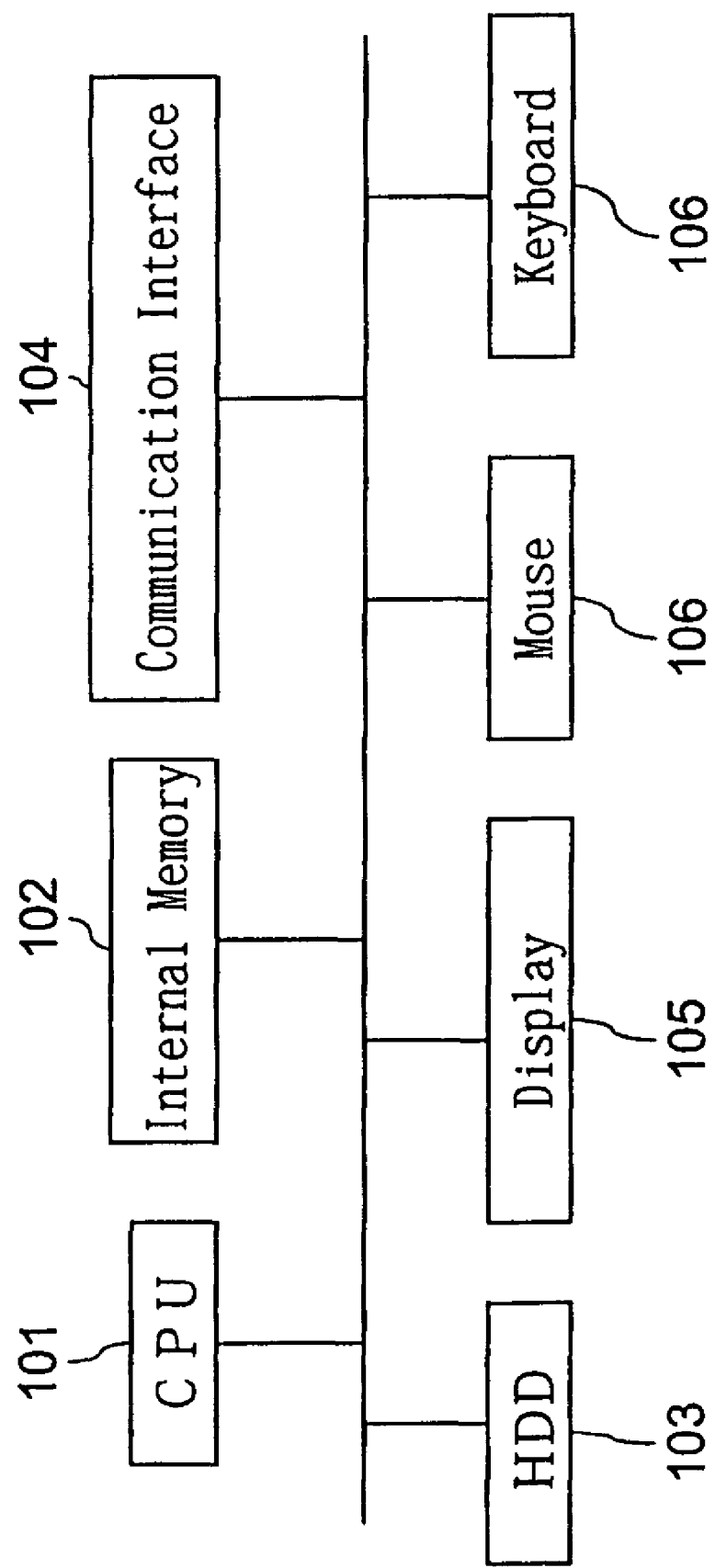
FIG. 2 is a schematic representation of an equipment configuration showing an internal configuration of a client computer in accordance with an embodiment of the present invention.

As shown in FIG. 2, the client computers P1 are multi-purpose computers having, for example, a browsing function provided by software, and comprised of typical computer hardware devices such as a Central Processing Unit (CPU) 101, an internal memory 102, an auxiliary data storage unit 103 such as a Hard Disk Drive (HDD), a communication interface 104 such as a modem or network interface card (NIC) that can connect with a communication network, a display 105, and a means for input and Graphical User Interface (GUI) control 106 such as a mouse and a keyboard.

Figure 3:
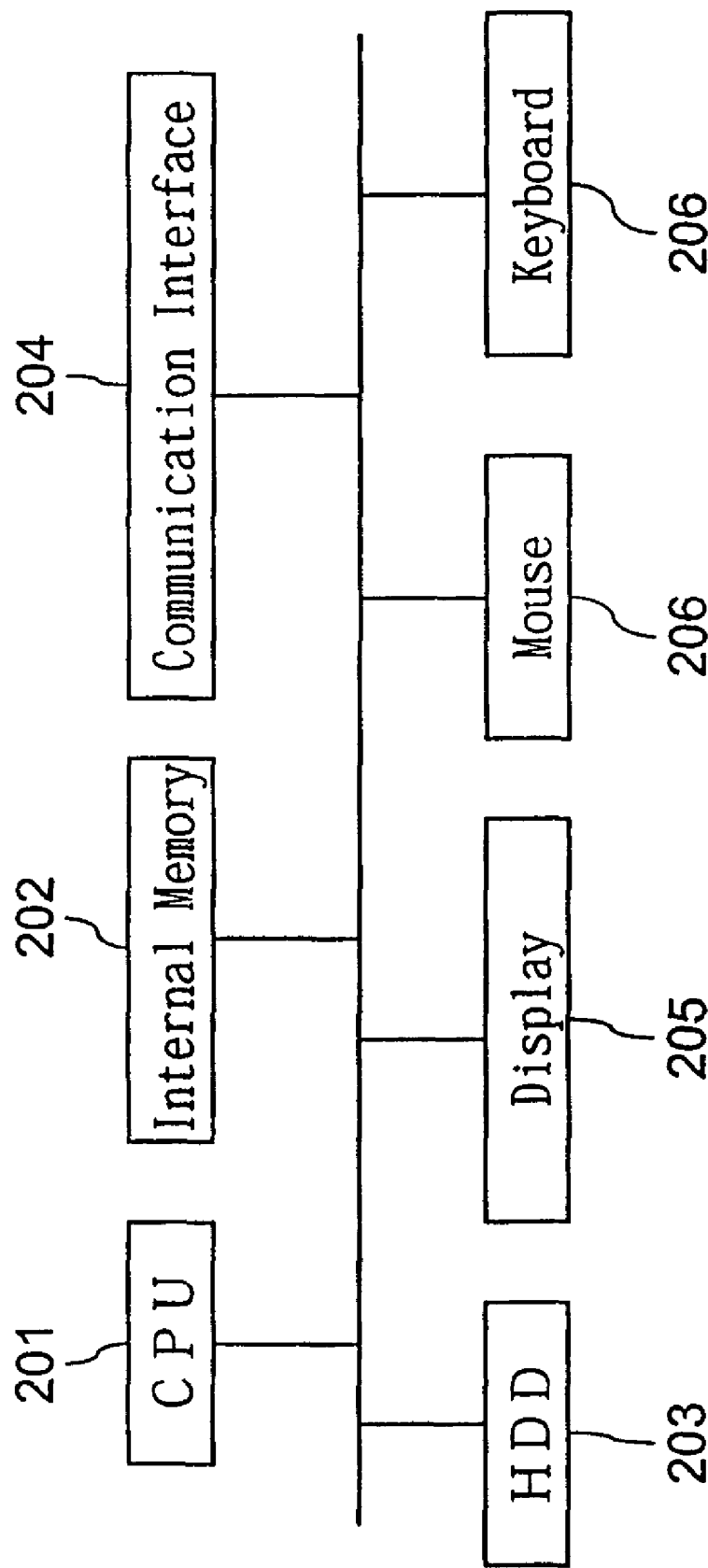
FIG. 3 is a schematic representation of an equipment configuration showing an internal configuration of a server computer in accordance with an embodiment of the present invention.

The server computer P2 is a multi-purpose computer having, for example, a server function, and comprised, as shown in FIG. 3, of one (or more) CPU(s) 201, internal memory 202, an auxiliary data storage unit 203 such as one (or more) HDD(s), a communication interface 204 such as a modem or NIC that can connect with a communication network, a display 205, and a means for input and control 206, such as a mouse and a keyboard. None of the above computers is necessarily limited to being a multi-purpose computer; they may be for exclusive use, or each computer may not be physically separated, but may be integrated into a single unit.

Figure 4:
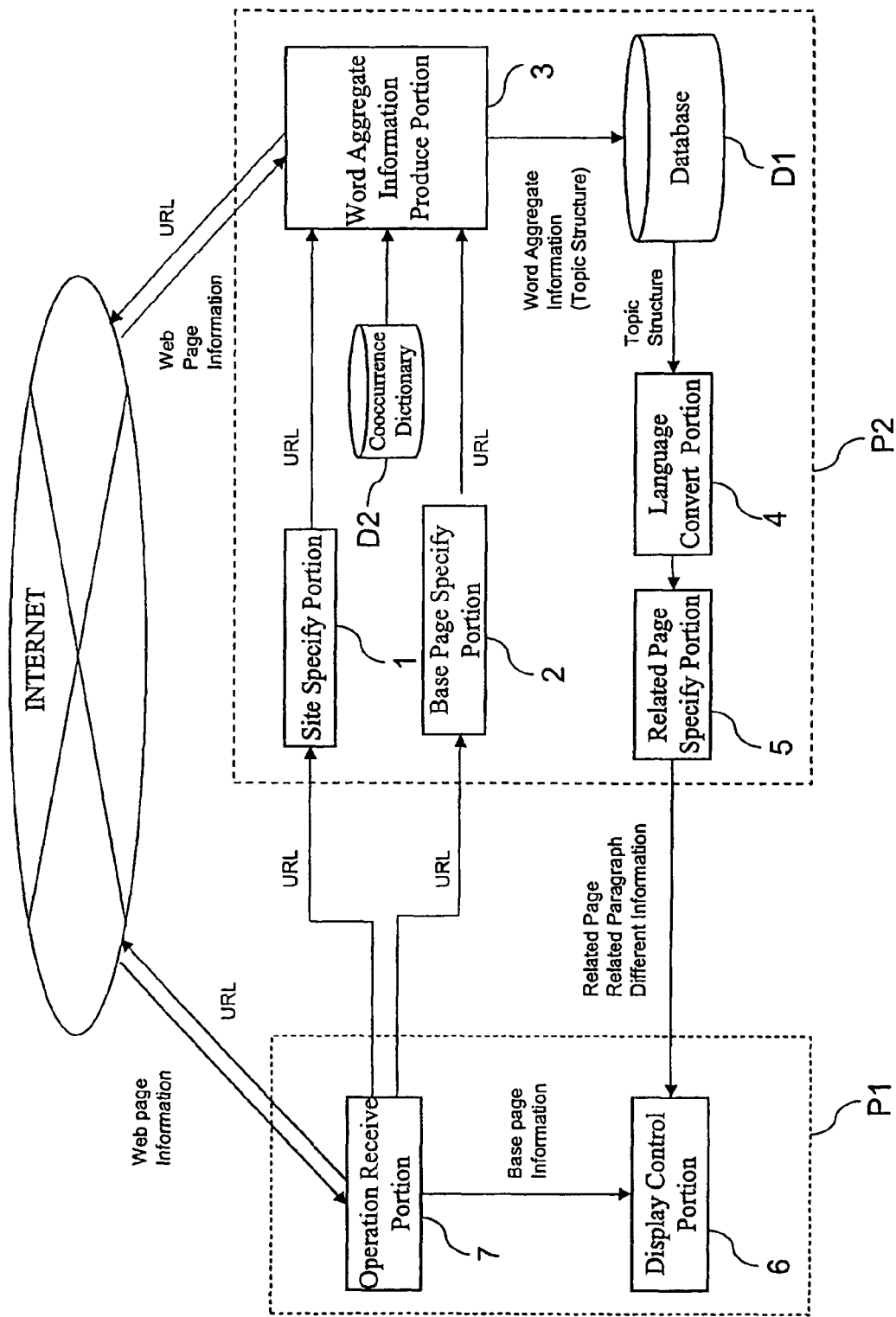
FIG. 4 is a functional block diagram of the system in accordance with an embodiment of the present invention.

Explaining from a functional point of view, as shown in FIG. 4, predetermined programs are installed on each computer P1 and P2, and the CPUs 101 and 201 and the peripheral equipment are operated together based on these programs so that this system fulfills its function as a site specifying portion 1 or unit, a base page specifying portion 2 or unit, a language converting portion 4 or unit, an aggregated word information producing portion 3 or a word information unit 3, a related page specifying portion 5 or unit, and a display controlling portion 6 or unit, for example. In the illustrated embodiment, the site specifying unit 1, the base page specifying unit 2, the language converting unit 4, the word information unit 3, and the related page specifying unit 5 are arranged for operation within the server computer P2, while the display controlling unit 6 is arranged for operation in the client computer(s) P1. However, the system is not limited to this configuration alone.

Each program portion or unit will be briefly explained in the following. The site specifying portion 1 receives an identifier of a base site as a Web site that becomes the basis of the display, and specifies this base site, and receives an identifier of a compared site as a Web site displayed in a language different from that of the base site, and specifies the compared site. The base page specifying portion 2 specifies a base page as a Web page from the base site, with said Web page shown on the display. The language converting portion 4 has functions to consolidate the languages of the words included in each site into a single language.

The aggregated word information producing portion 3 has functions to produce aggregated word information that represents all or some of the words included in a Web page or a paragraph provided by the language converting portion 4, in a manner that facilitates comparison with other aggregated word information. The related page specifying portion 5 specifies one or a number of related Web pages that are appropriately similar to the base page, said pages being selected from each of the compared pages based on a comparison between aggregated word information of the base page and aggregated word information for each of the compared pages of the compared site. The display controlling portion 6 displays the related page on the same display screen together with the base page.

Figure 5:
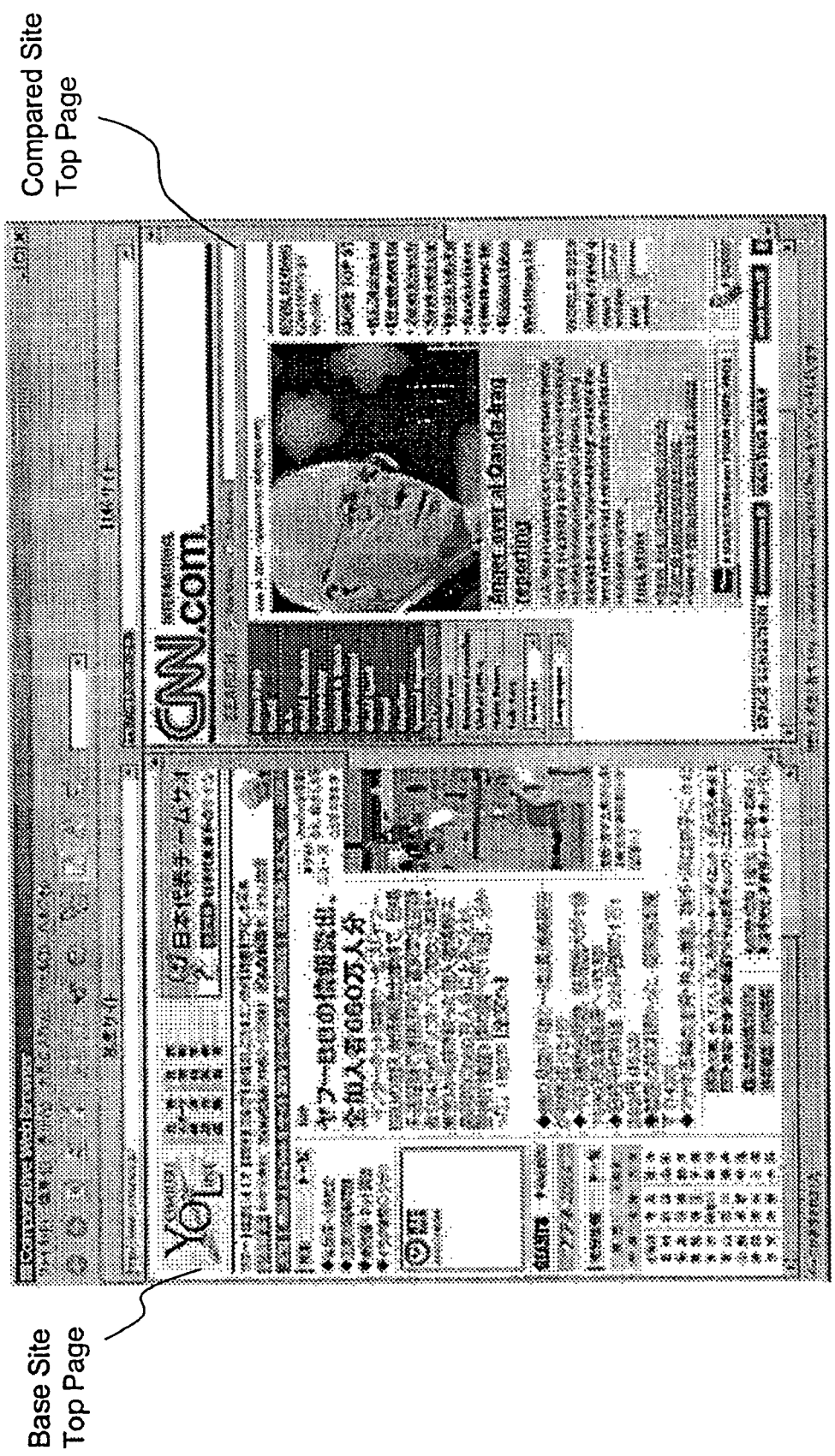
FIG. 5 is a real screen view showing an initial screen in accordance with an embodiment of the present invention.

B. Performance: Each portion will be described in combination with an explanation of the performance of this system. (1): A user designates URLs (Uniform Resource Locators, identifiers of Web addresses) of a base site and a site to be compared. An initial page of each site is then displayed as shown in FIG. 5. Next, the user selects a Web page that the user wants to browse (hereinafter referred as a base page) from the displayed base site by clicking an anchor-element that designates the base page and then the base page is displayed. At this time, the base site and the compared site have related content and are presented in different languages (for example, the base site is shown in Japanese and the compared site is shown in English).

The above-mentioned sequence of the user's operation is received by an operation receiving portion 7 of the client computer P1, and the site specifying portion 1 and the base page specifying portion 2 of the server computer P2 specify each Web site, as well as the base page, based on the designated URLs. Next, the aggregated word information producing portion 3 verifies whether recent information (for example, content less than 1 hour old) on the designated sites has already been registered in a database D1.

If such information is not registered, the aggregated word information producing portion 3 obtains it, as shown in (2) as described below, obtaining predetermined Web page information from each Internet site. Then each Web page is analyzed and the results are registered in the database D1. If the information is already registered, an operation described in (3) below is conducted.

(2): In this system, word dictionary software is used to compare sites whose languages are different. Since current word dictionary software cannot convert all language content completely, the areas to be compared between two sites are limited to a certain size beforehand, and related pages are found. The areas to be compared are termed compared areas. For example, a news site is classified into each category. The compared areas are determined by finding similar shared categories.

Figure 6:
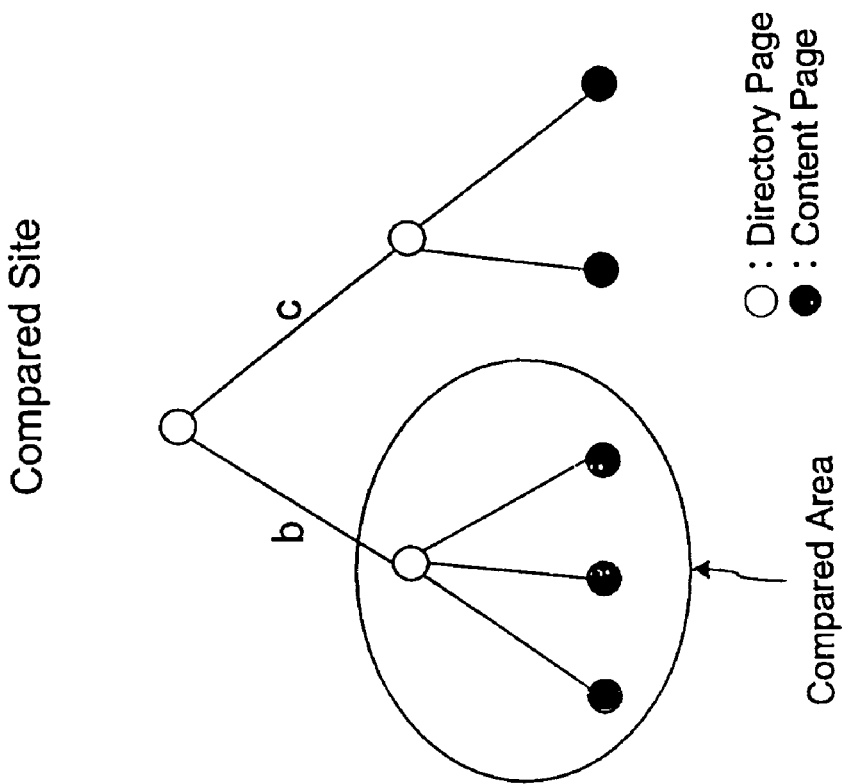
FIG. 6 is a pattern diagram showing compared areas in accordance with an embodiment of the present invention.
Figure 6:
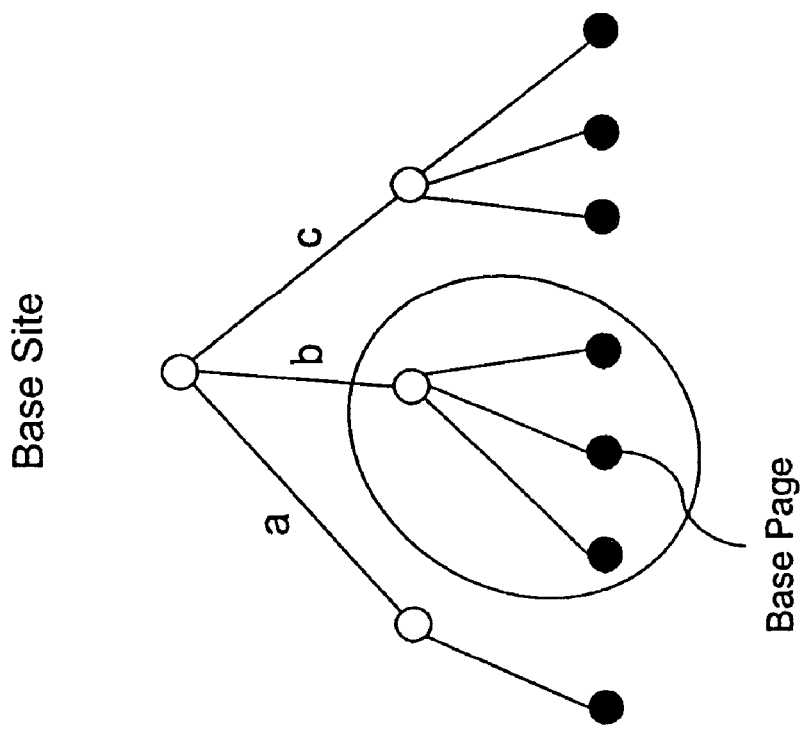

More concretely, as shown in FIG. 6, each site is divided into directory and content pages. The term "directory page" here indicates a page mostly consisting of anchor-elements. A page other than a directory page is called a content page. An anchor text shown in a directory page is treated as a category name, wherein the anchor text is a text that the anchor-element indicates. In other words, a category name in the base page is an anchor text designating the directory page that links the base page. The language of the category name of the base page is converted into. the language of compared site by the dictionary software. The category name of the base page is then found in the compared site. An area including all pages that are child nodes of the found category becomes the compared area.

Next, Topic Structures (aggregated word information, hereinafter called TS) are produced for a Web page in the compared area (hereinafter called a compared page) and the base page, by page and by paragraph. TSs consist of a topic (a word) $t_i$, i $\in (1, \ldots, n)$ where $t_i$ is comprised of a set consisting of subject words $s_i$ and a set of content words $C_i$. In addition, $C_i$ consists of multiple content words $C_{im}$, m $\in (1, \ldots, k)$.

In other words, a TS is defined as follows.

$$TS = \{t_1, \ldots, t_i, \ldots, t_n\}$$

$$t_i = (s_i, C_i)$$

$$C_i \{c_{il}, \ldots, c_{im}\}$$

An above-mentioned subject word is a word whose density is high in a given page (or paragraph) and in this system, subject words are extracted according to a frequency of word appearance measure, in order to obtain relationships of similarity across different pages (or paragraphs). Target words are limited to nouns only. Specifically, for a word t to be considered a subject word candidate, the requirements are as follows.

$$tf(t) \times weight(t) > \alpha$$

where tf(t) is the frequency of appearance of t in the page (or paragraph), weight(t) is a weighting factor for the word that is applied according to its part of speech, and $\alpha$ is a threshold value. The weighting factors, weight(t), are here, for example, 3.0 for a proper noun, 0.1 for a number, 0.1 for a numerical classifier, 1.0 for a general noun and 0.9 for other nouns.

An above-mentioned content word is a word whose degree of concurrence with the subject word is high. In this system, a word concurrence dictionary D2 is created beforehand and the concurrence degree is obtained by the use of this concurrence dictionary D2, which has a database structure. If a subject word in a page (or paragraph) is $\{s_1 \ldots, s_i \ldots, s_n\}$, $C_i = \{c_{il}, \ldots, c_{ij}\}$ as a group of the content words is obtained for each subject word $s_i$. $c_{ij}$ is a word whose concurrence degree with $s_i$ is not less than a certain threshold value ($\beta$). Content words, like subject words, are also exclusively targeted at nouns. As mentioned above, subject and content words in a page (or paragraph) are determined. Then, the TS of a page (or paragraph) becomes $\{t_1 = (s_1, C_1), \ldots t_n = (s_n, C_n)\}$. TSs are stored in the above-mentioned database D1.

(3): Next, the related page specifying portion 5 produces a feature vector for subject words and a feature vector for content words from the TSs stored in the above database, compares the base page and each compared page by the use of respective Euclidian distances, and obtains content difference information based on TSs at a page level and TSs at a paragraph level. A paragraph that is to be a basis for comparison at a paragraph level is, for example, a paragraph (hereinafter called as a base paragraph) located in the center portion of the base page shown in the left portion of the display screen. Prior to this, the dictionary software (language converting portion 4) converts compared site's language subject and content words into corresponding base site's language subject and content words. In cases where multiple base site's language versions correspond to a single compared site's language word, multiple base site's language versions become candidates for the particular subject word.

A similarity degree of a given subject word, $Sim_s$, and a similarity degree of a given content word, $Sim_c$, between the two pages (or paragraphs), are determined as follows.

$$Sim_s = [(f_b(s_1) - f_c(s_1))^2 + \ldots + (f_b(s_n) - f_c(s_n))^2]^{1/2}$$

$$Sim_c = [(f_b(c_1) - f_c(c_1))^2 + \ldots + (f_b(c_m) - f_c(c_m))^2]^{1/2}$$

$$F_b(s_n) = tf(s_n) \times weight(s_n)$$

where $f_b(s_n)$ is an element of a feature vector of the subject word of the base page (or paragraph) and $f_c(s_n)$ is an element of a feature vector of the subject word of the compared page (or paragraph). Similarly, $f_b(c_m)$ is an element of a feature vector of the content word of the base page (or paragraph) and $f_c(c_m)$ is an element of a feature vector of the content word of the compared page (or paragraph). Difference information between two pages (or paragraphs) is obtained as follows, based on the similarity degrees of the subject and content words obtained from the above.

Global similarity: In cases where the similarity degrees of the subject and content words are less than or equal to a certain threshold value, the two pages (paragraphs) become similar in a global sense, that is, become related pages (or paragraphs) because the subject words of one page (or paragraph) are similar to the other and the content words of one page (or paragraph) are similar to the other.

Content difference: In cases where the similarity degree of a subject word is less than or equal to a certain threshold value and the similarity degree of a content word is greater than the threshold value, the two pages are similar regarding the subject word but different regarding the content word, so the status as a page (or paragraph) with different content is clearly recognized.

Subject difference: In cases where the similarity degree of a subject word is greater than a certain threshold value and the similarity degree of a content word is less than or equal to a certain threshold value, the two pages are different regarding the subject word but similar regarding the content word, so the status as a page (or paragraph) with a different subject is clearly recognized.

A compared page whose Euclidian distance from the base page is the smallest is set as the most related page among the set of compared pages judged to be globally similar to the base page. A paragraph that is judged to be globally similar to the base paragraph and whose Euclidian distance from the base paragraph is the smallest is set as the most related paragraph among the paragraphs in the related page.

Figure 7:
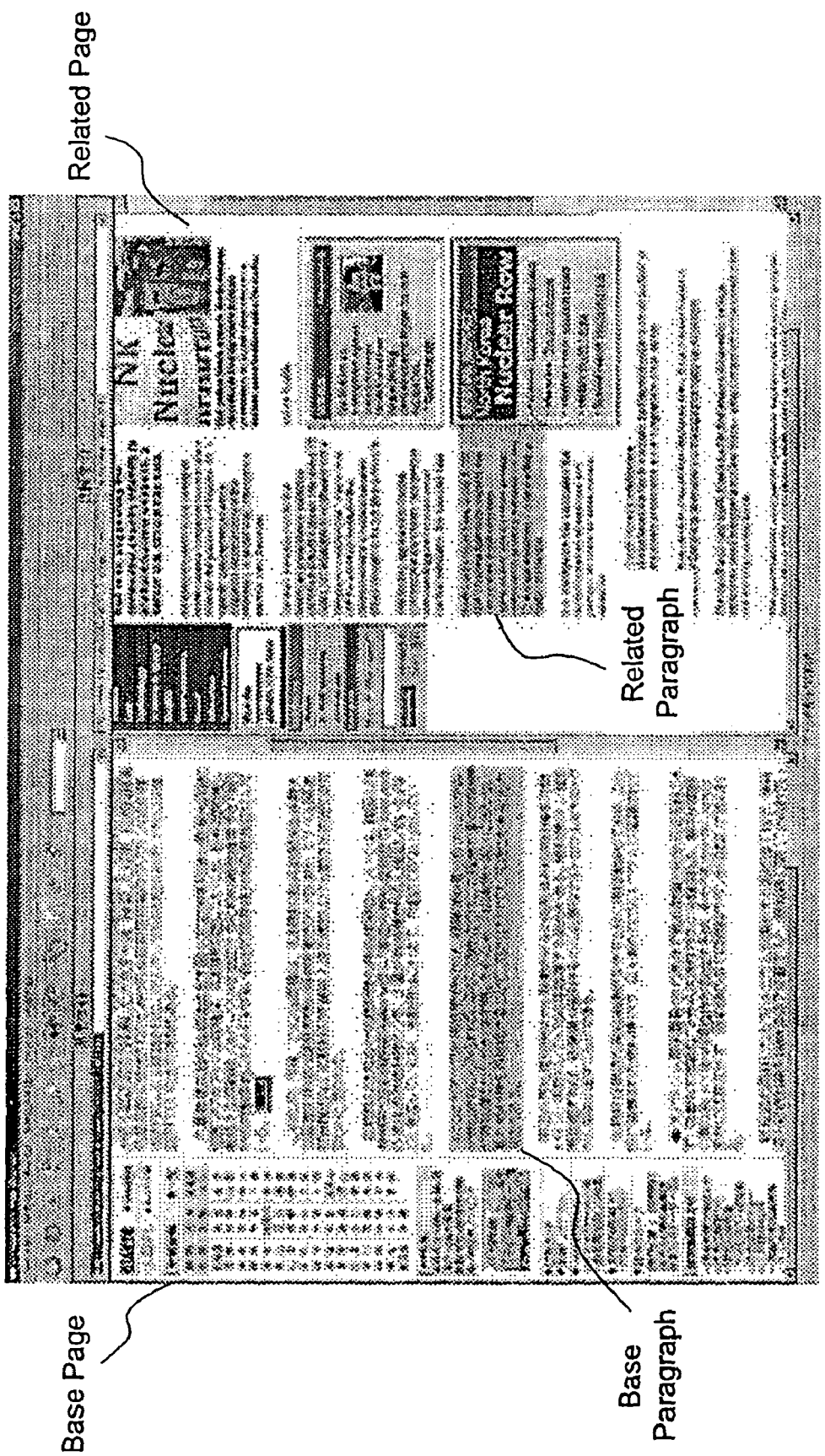
FIG. 7 is a real screen view showing a display mode of a base paragraph and a related paragraph in accordance with an embodiment of the present invention.

(4): The display controlling portion 6 displays the specified related page in the same window as that of the base page. At this time, the display controlling portion 6 controls the display mode so as to simultaneously display the base paragraph and the related paragraph, for example, at nearly the same horizontal level on the display screen (refer to FIG. 7).

Figure 8:
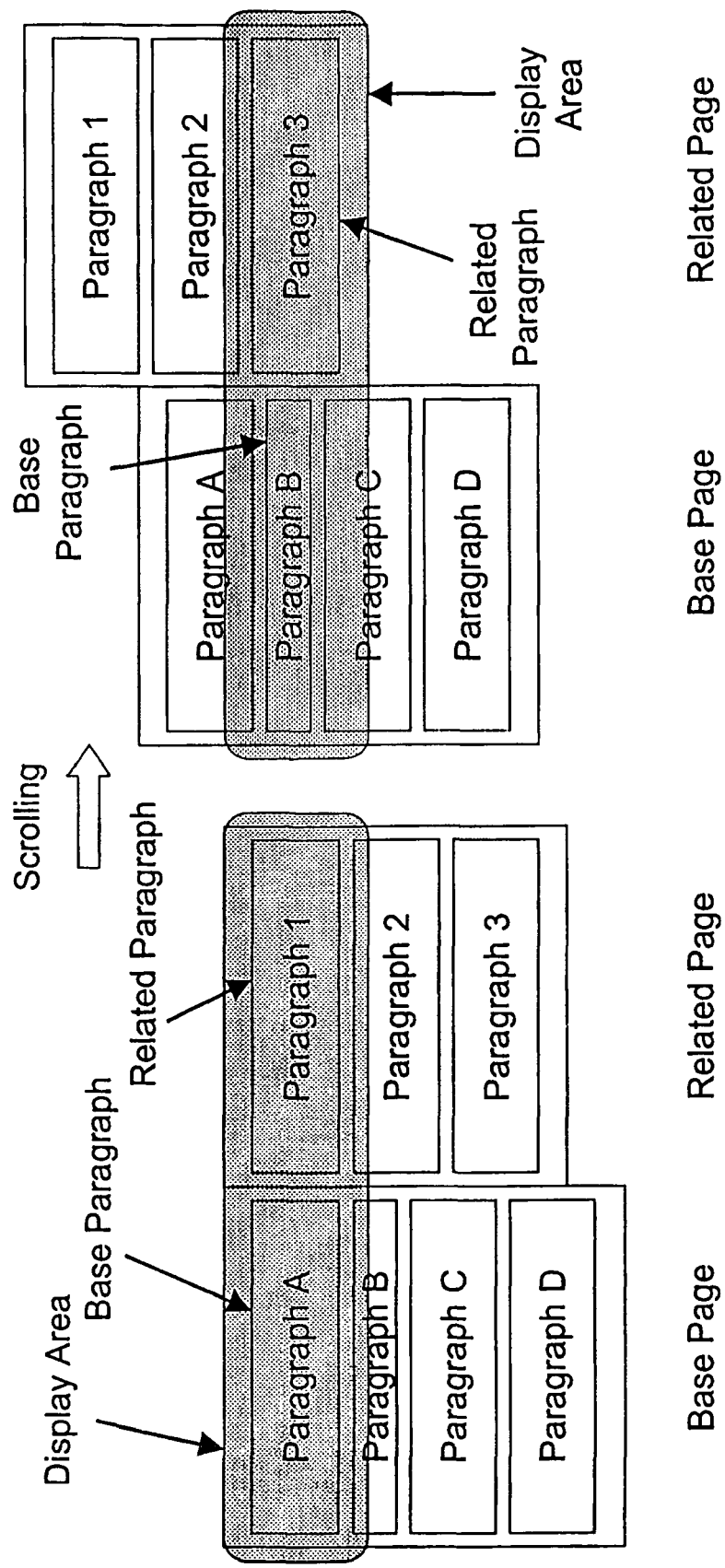
FIG. 8 is a pattern screen view that explains the synchronized scrolling of a base page and a related page in accordance with an embodiment of the present invention.

As a result, when the user scrolls the base page, the base paragraph is changed. Then, the related page is automatically scrolled synchronously so as to display a related paragraph corresponding to the changed base paragraph, displaying both in a manner as noted above that maintains a horizontal congruence (refer to FIG. 8). In addition, in cases where the user clicks an anchor or a forward/back button and changes the base page, a page that is related to the changed base page is specified and displayed alongside in the same window in each case.

Web pages usually consist of multiple paragraphs and it often happens that these multiple paragraphs are displayed in a single window. In this system, two Web pages are presented simultaneously and navigated synchronously by the operation of a user, who may have difficulty grasping the differences between similar and different paragraphs in the compared page. Therefore, in this embodiment, a globally related paragraph, a content different paragraph, and a subject different paragraph selected by the related page specifying portion 5 can all be presented in visually differentiated styles. Several methods are conceivable for carrying out this visualization, and here, such differentiation is presented by means of separate colors. This makes it possible for the user to clearly recognize which paragraph is a related paragraph or which paragraph is a paragraph with differences in the compared page.

Figure 9:
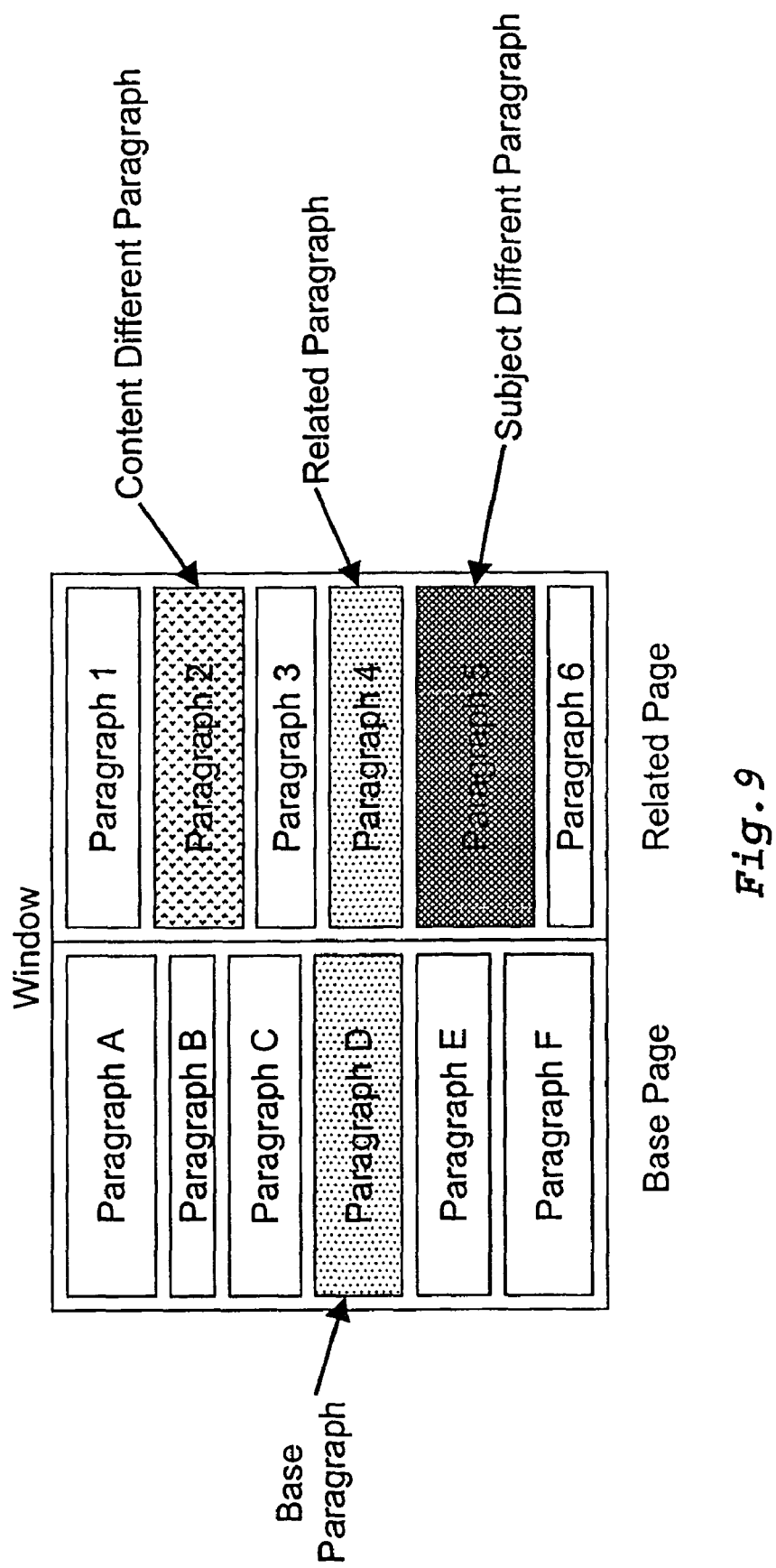
FIG. 9 is a pattern screen view that explains a display mode whereby paragraphs with different information are presented in a visually distinctive manner in accordance with an embodiment of the present invention.

More concretely, as the pattern diagram shown in FIG. 9 illustrates, for example, a globally related paragraph is displayed in red, a content different paragraph is in green, and a subject different paragraph is in blue, according to a given color coding scheme. In addition, in cases where there are multiple globally related paragraphs, multiple content different paragraphs, or multiple subject different paragraphs in each page, the system can present these differences clearly and usefully. For instance, when there are subject different paragraphs, the first subject different paragraph can be displayed in blue, the next subject different paragraph in aqua or the like, so as to display these subject different paragraphs in a way instantly recognizable according to the gradation of color.

Figure 10:
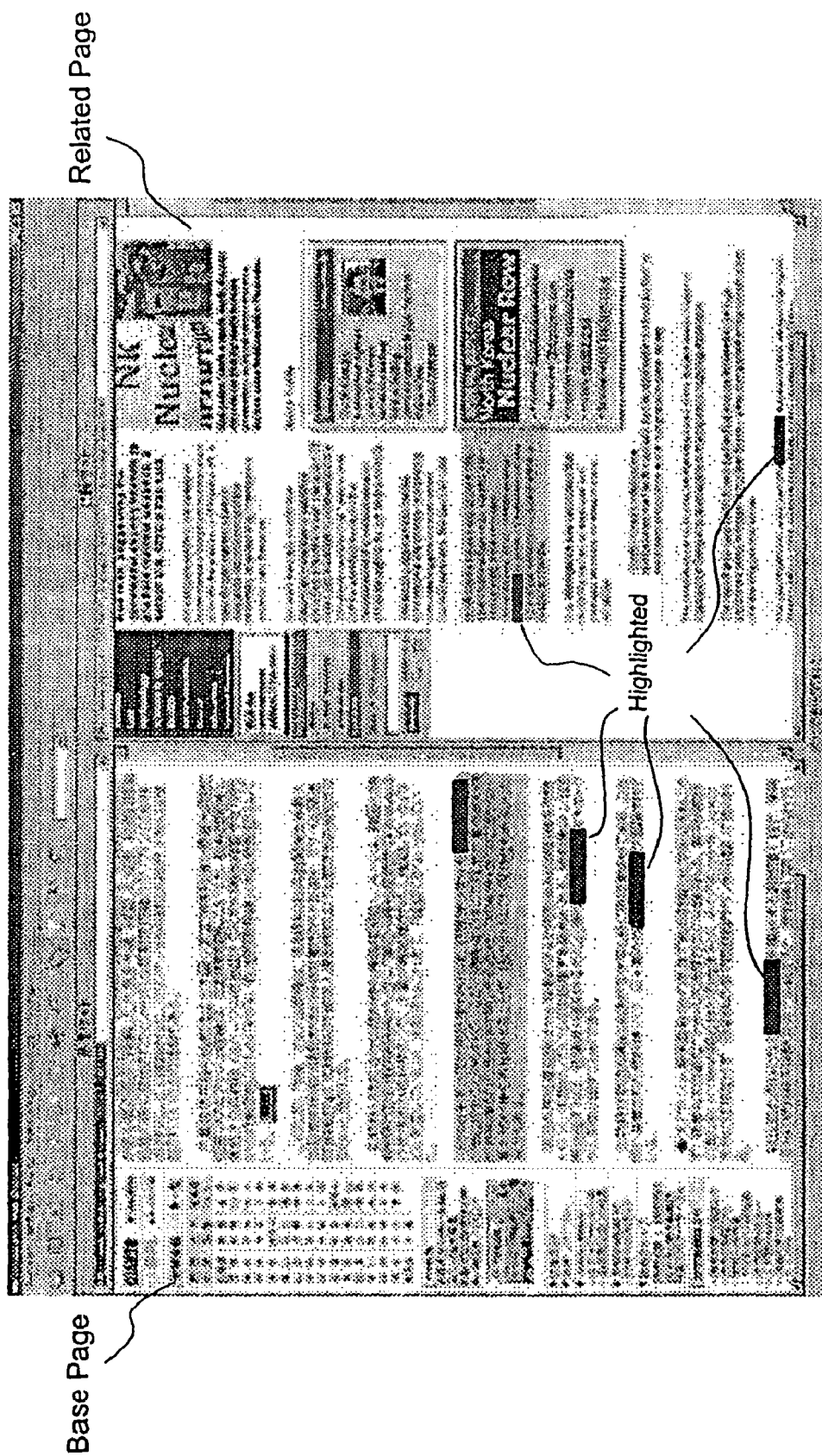
FIG. 10 is a real screen view showing a display mode whereby particular words are highlighted in accordance with an embodiment of the present invention.

Furthermore, since two pages in different languages can be simultaneously presented by the system, it may be difficult for the user to find specifically correlated words. To meet this need, when the user selects a word in the base page, it is displayed in a different mode from other words so that correlated words in the base page and in the related page are clearly highlighted in the display, as shown in FIG. 10. It thus becomes possible for the user to intuitively grasp the relationship between specific words that are strongly correlated across different languages (refer to FIG. 10).

In addition, although not shown in these drawings, in cases where there is no paragraph related to the base paragraph in the compared page, this system searches for related paragraphs in other compared pages. When a paragraph similar to the base paragraph is found among other compared pages, an icon indicating partially similarity is displayed in the paragraph in the base page. When the user clicks this particular icon, the system displays the relevant page, including the related paragraph, in another window, as a partially similar page.

C Summary: As mentioned above, in accordance with this embodiment, simply navigating to and within a Web site written in one language (such as Japanese) enables the presentation and operation of a related site written in another language (such as English), synchronously and automatically, and enables differences in the information contained in each paragraph in the related pages to be grasped visually, thereby greatly facilitating the browsing and comparison of multiple pages presented in a variety of languages.

The present claimed invention is not limited to this embodiment. For example, a method for presenting difference information is offered that makes use of differently colored paragraphs in the above embodiment, however, simply presenting and aligning related paragraphs according to a coloring scheme merely shows that they contain related information but does not make clear the nature or details of the relationship between the paragraphs. Thus, another visual presentation method for this type of information may be adopted, one that clearly delineates and explicates the particulars of these relationships. In addition, multiple sites in multiple languages may be presented comparatively, all referring to a single base site, and language conversion may be conducted when registered in database D1.

Those skilled in the art will appreciate that various adaptations and modifications of the just-described preferred embodiment can be configured without departing from the scope and spirit of the invention. Therefore, it is to be understood that, within the scope of the amended claims, the invention may be practiced other than as specifically described herein.

What is claimed is:

1. A related text comparison system stored in a non-transitory computer readable medium, comprising:
a first collection of data including a plurality of first text pages, each of the first text pages including a plurality of words, each of the first text pages being characterized as one of a directory page and a content page, each of the directory page including a reference to one or more of the first text pages, a first directory page being selected from the first collection as a base directory, the based directory having a first reference to a first content page being selected from the base directory as a base page, the first reference including a category name for the base directory;
a second collection of data including a plurality of second text pages, each of the second text pages including a plurality of words, each of the second text pages being characterized as one of a second directory page and a content page, each of the second directory page including a reference to one or more of the second text pages; and
a related page specifying unit for receiving the category name of the base page and parsing the second collection of data to specify one of the second directory page by matching the category name to the specified directory as a compare directory, the compare directory referencing one or more content pages from the second collection of data as compare pages,
wherein the compare pages are determined to be related to the base page,
wherein further comprising:
a word information unit for parsing the base page and the compare pages to determine a degree of comparison between the base page and each of the compare pages,
wherein the word information unit produces a topic structure $TS=\{t_1 \ldots t_i \ldots t_n\}$ consisting of a set of topics $t_i$ for each of the base page and the compare pages, each $t_i$ including a set of subject words $s_i$ and a set of content words $C_i$,
wherein a word (t) from a given text page tf(t) can be considered as a subject word $s_i$ from the set of subject words based on an objective measure, the objective measure being a product of frequency of appearance of the word (t) in the given text page tf(t) and a weighting factor weight(t) according to part of speech of the word (t), and the word (t) being considered a subject word $s_i$ when the product exceeds a threshold value $\alpha$, the product being expressed as:

$$tf(t) \times weight(t) > \alpha.$$

2. The system of claim 1, further comprising:

a display unit for displaying the base page and the compare pages in a visual format capable of viewing by a user.

3. The system of claim 2, wherein the base page is displayed in a side-by-side manner with one or more of the compare pages.

4. The system of claim 1, further comprising:

a language converting unit for receiving the category name of the base page in a first language and converting the category name into a second language, wherein the words of the first collection text pages are in the first language and the words of the second collection text pages are in the second language, the second language being different from the first language.

5. The system of claim 1, wherein the first and second text pages are browser readable pages associated with a global communication network site.

6. The system of claim 1, wherein the word information unit determines a degree of comparison between a paragraph in the base page and each paragraph in each of the compare pages.

7. The system of claim 1, further comprising:

a concurrence dictionary for providing a degree of concurrence between words, wherein the word from the given text page can be considered as a content word $C_i$ when the concurrence degree between the word and the subject $s_i$ exceeds a threshold $\beta$, the TS of a page being $TS=\{t_1=(s_1,C_1), \ldots, t_i=(s_i, C_i), \ldots, t_n=(s_n,C_n)\}$.

8. The system of claim 7, wherein the related page specifying unit produces a feature vector for each of the subject words and the content words for comparing the base page and each of the compare pages based on a Euclidean distance.

* * * * *